3,056,820
PROCESS FOR THE PRODUCTION OF METAL
N-SUBSTITUTED CARBAMATE SALTS
Thomas W. Martinek, Crystal Lake, Ill., assignor to The
Pure Oil Company, Chicago, Ill., a corporation of
Ohio
No Drawing. Filed Dec. 8, 1958, Ser. No. 778,623
14 Claims. (Cl. 260—429.7)

This invention is directed to novel metal N-substituted carbamate and thiocarbamate salts and to methods of preparation thereof.

In my copending application, Serial No. 762,281, filed September 22, 1958, I have described greases which are thickened with metal N-substituted carbamate salts and methods of preparing such greases. Some of the carbamate salts which I have used in the preparation of greases are not reported elsewhere in the literature and are believed to be a new class of compounds.

It is one of the objects of this invention to provide an improved method for the preparation of N-substituted carbamate salts.

Another object of this invention is to provide a method in which a metal N-substituted amide is reacted with carbon dioxide or carbon disulfide to produce a metal N-substituted carbamate or thiocarbamate.

A feature of this invention is the provision of a new class of compounds, the N-substituted carbamates of polyvalent metals.

Another feature of this invention is the provision of a process wherein carbon dioxide or carbon disulfide is reacted with a metal N-substituted amide in an inert organic liquid to produce a metal N-substituted carbamate or thiocarbamate which is separated from liquid as a substantially pure salt.

Other objects and features of this invention will become apparent from time to time throughout the specification and claims as hereinafter related.

This invention is based upon my discovery that metal N-substituted amides will react with carbon dioxide or carbon disulfide in an inert organic liquid to form a metal N-substituted carbamate or thiocarbamate. The metal N-substituted amide and carbon dioxide or carbon disulfide react in equimolar proportions at temperatures in the range from about 0° to about 200° C. The temperature of this reaction is not critical and may be varied even outside these limits. The reaction temperature used is in each case the one which is most effective for effecting the reaction of the particular metal N-substituted amide and carbon dioxide or carbon disulfide. The organic liquid which is used may be any inert organic liquid, i.e., any organic liquid which is not chemically reactive with the reactants or reaction products and which is thermally stable at the reaction temperature. When volatile liquids, such as pentane, hexane, methyl ether, ethyl ether, tetrahydrofuran, and the like are used as the reaction medium, it is necessary to carry the process out under pressure to prevent evaporation of the reaction liquid. When high-boiling inert liquids, such as naphthas, mineral oil, dodecane, high-molecular-weight ethers and polyethers, etc., are used, the reaction may be carried out at atmospheric pressure.

The following non-limiting examples are illustrative of the scope of this invention:

EXAMPLE I

A dispersion of 5.2 g. of sodium and 15.6 g. of 200 vis. neutral oil is prepared by heating a mixture of sodium and neutral oil in an atmosphere of nitrogen until the sodium has melted, followed by stirring at high speed until a fine dispersion is effected. The dispersion is then cooled below the melting point of sodium without stirring. To this dispersion of sodium in neutral oil, there is added 10.1 parts by weight of dimethylamine and 59.2 g. of 200 vis. neutral oil. The mixture is heated to 100° C. and agitation continued until reaction has ceased, as evidenced by cessation of evolution of hydrogen. At this point the mixture consists of a dispersion of 15 g. of sodium dimethylamide, $NaN(CH_3)_2$, in 75 g. of 200 vis. neutral oil. Carbon dioxide is then bubbled through the mixture with continued stirring until 9.9 g. of carbon dioxide has reacted with the sodium dimethylamide to produce a colloidal dispersion of 25.2 g. of sodium dimethylcarbamate in 75 g. of neutral oil. The sodium dimethylcarbamate causes the mineral oil to form a grease-like gel which may be used as a lubricating grease if desired. The sodium dimethylcarmamate mineral oil gel is diluted with hexane to precipitate the sodium dimethylcarbamate. The product is filtered from the hexane-mineral oil mixture and rewashed and refiltered and finally stripped with nitrogen to yield 25 g. of sodium dimethylcarbamate, a white crystalline solid.

In the manufacture of metal N-substituted carbamates in accordance with this invention, the metal N-substituted amides may be prepared by any of the known methods for preparing such compounds. Metal N-substituted amides may be prepared by reaction of a finely-divided metal, preferably a colloidal dispersion thereof, in an inert liquid with a primary or secondary amine. The presence of a reactive compound as a hydrogen acceptor for by-product hydrogen from this reaction will cause the reaction to proceed more readily. These N-substituted amides may also be prepared by reaction of a simple metal amide with an amine or by reaction of a finely-divided metal with a halogenated amine, such as dimethylchloro amine.

EXAMPLE II

A dispersion of sodium in 200 vis. neutral oil is prepared as in Example I and reacted with dimethylamine to form a colloidal dispersion of sodium dimethylamide. The dispersion of sodium dimethylamide is then reacted with an equimolar amount of carbon disulfide and mixture agitated, at a temperature of 125°–150° C. until reaction is complete. At the end of about 20 minutes reaction is complete and the mineral oil has formed a soft fluid gel containing sodium dimethyldithiocarbamate. This gel is diluted with benzene and filtered, rewashed with benzene, refiltered, and finally stripped with helium. After stripping, there is obtained a 95% yield of sodium dimethyldithiocarbamate.

A series of experiments, enumerated in Table I, are carried out in which various metal N-substituted amides are reacted with carbon dioxide or carbon disulfide in an inert organic reaction medium. In each case the reaction goes to completion in less than 30 minutes and forms a gelatinous or semigelatinous product of the liquid reaction medium and the product metal N-substituted carbamate or thiocarbamate salt.

Table I

\* $M(NR_2)_n + nCX_2 \rightarrow M(R_2NCX_2)_n$

| Example Number | M | R | X | Reaction Medium | Temp, °C. | Product |
|---|---|---|---|---|---|---|
| 1 | Na | CH₃ | O | 200 vis. Neutral Oil | 125–150 | $NaN(CH_3)_2CO_2$. |
| 2 | Na | CH₃ | S | ----do---- | 125–150 | $NaN(CH_3)_2CS_2$. |
| 3 | Na | n-C₄H₉ | O | Toluene | 100–120 | $NaN(n\text{-}C_4H_9)_2CO_2$. |
| 4 | Na | H and n-C₄H₉ | O | ----do---- | 100–120 | $NaNH(n\text{-}C_4H_9)CO_2$. |
| 5 | Na | Mixture derived from coconut oil. | O | 200 vis. Neutral Oil | 125–150 | $NaNR_2CO_2$. |
| 6 | Na | C₆H₅CH₂ | O | ----do---- | 125–150 | $NaN(C_6H_5CH_2)_2CO_2$. |
| 7 | Li | CH₃ | O | ----do---- | 175 | $LiN(CH_3)_2CO_2$. |
| 8 | Li | CH₃ | S | ----do---- | 175 | $LiN(CH_3)_2CS_2$. |
| 9 | Li | Mixture derived from coconut oil. | O | ----do---- | 175 | $LiNR_2CO_2$. |
| 10 | Li | H and 1-Methyl octyl | O | ----do---- | 175 | $LiNH(CH_3C_8H_{16})CO_2$. |
| 11 | Ca | H and n-C₄H₉ | O | ----do---- | 150–175 | $Ca(NHC_4H_9CO_2)_2$. |
| 12 | Ca | H and CH₃ | S | Hexane | 150 | $Ca(NHCH_3CS_2)_2$. |
| 13 | Mg | H and CH₃ | O | Benzene | 75–100 | $Mg(NHCH_3CO_2)_2$. |
| 14 | Mg | H and CH₃ | S | ----do---- | 75–100 | $Mg(NHCH_3CS_2)_2$. |
| 15 | Ba | CH₃ | O | 200 vis. Neutral Oil | 75 | $Ca(N(CH_3)_2CO_2)_2$. |
| 16 | Al | CH₃ | O | ----do---- | 75 | $Al(N(CH_3)_2CO_2)_3$. |
| 17 | Sr | CH₃ | O | ----do---- | 75 | $Sr(N(CH_3)_2CO_2)_2$. |
| 18 | Sn | C₂H₅ | O | ----do---- | 120 | $Sn(N(C_2H_5)_2CO_2)_4$. |
| 19 | Pb | H and n-C₄H₉ | O | ----do---- | 150 | $Pb(NHC_4H_5CO_2)_2$. |
| 20 | Pb | CH₃ | S | ----do---- | 150 | $Pb(N(CH_3)_2CS_2)_2$. |

\* M is any metal.   R is hydrogen or a C₁–C₃₀ alkyl or aralkyl radical.   X is oxygen or sulfur.   *n* is the valence of M.

In the examples in Table I where the reaction medium is a volatile liquid, e.g., Examples 3, 4, 12, 13, 14, the reaction medium liquid is merely stripped from the product with an inert gas, nitrogen or helium, to leave a crystalline product as the residue. In each case, the indicated product is obtained in a yield of substantially 100% and purity of substantially 100%. In the examples where the liquid reaction medium is a non-volatile liquid, e.g., 200 vis. neutral oil (as in Examples 5 to 11 and 15 to 20), the gelatinous or semigelatinous product mixture is washed with a volatile solvent, e.g., pentane, hexane, benzene, or toluene, filtered, rewashed with a volatile solvent, refiltered, and finally stripped with an inert gas to remove the solvent. In each case, the indicated product is obtained in the yield of substantially 100% and purity of substantially 100%. In Table I, there are set forth 20 examples in which various metal N-substituted amides are reacted with carbon dioxide or carbon disulfide in the stoichiometric amount required to produce the indicated N-substituted carbamate or thiocarbamate salts. Table I includes Examples 1 and 2 which might have been previously described and sets forth the reactants, reaction medium, reaction temperature, and product obtained in 18 additional runs in which various metal N-substituted carbamates and thiocarbamates are obtained. In these various runs, carbon dioxide or carbon disulfide is introduced into the liquid dispersion of the metal N-substituted amide with a moderate amount of agitation. In most of the examples, carbon dioxide or carbon disulfide is introduced in the gaseous state by bubbling it through the metal amide suspension or solution. The carbon dioxide may be added in the solid state as Dry Ice, which tends to cool the reaction mixture and counteract the very substantial heat of reaction (the reaction is highly exothermic). The products which are obtained are white crystalline solids which tend to hydrolyze slowly in moist air. These compounds decompose without melting at temperatures above about 250° C.

The metal N-substituted dithiocarbamates are well-known corrosion inhibitors. The metal N-substituted carbamates produced in accordance with this invention are useful as gelling agents for greases (the gels that are produced in the preparation of these salts may be used as is, as greases), and are useful as intermediates in the formation of N-substituted carbamate esters.

While I have described my invention fully and completely, as required by the patent laws, with special emphasis upon several preferred embodiments thereof, I wish it to be understood that within the scope of the appended claims this invention may be practiced otherwise than as specifically described herein.

What is claimed is:

1. A method of preparing substituted carbamate salts of the formula:

$$M(R_2NCO_2)_n$$

where M is a metal of the group consisting of alkali metals, alkaline earth metals, aluminum, lead, and tin, R is a radical of the group consisting of hydrogen, C₁–C₃₀ alkyl and aralkyl radicals, not more than one R being hydrogen, and *n* is the valence of M, which comprises reacting a compound of the formula:

$$M(NR_2)_n$$

with carbon dioxide wherein M, R and *n* are as previously defined, in a mineral oil solution to produce a greaselike gel containing said substituted carbamate salts, diluting said gel with a volatile hydrocarbon liquid to precipitate said salts, and separating and washing said precipitated salts to recover said substituted carbamate salts in substantially pure form and substantially quantitative yield.

2. A method in accordance with claim 1 in which M is an alkaline metal.

3. A method in accordance with claim 1 in which M is an alkaline earth metal.

4. A method in accordance with claim 1 in which M is aluminum.

5. A method in accordance with claim 1 in which M is lead.

6. A method in accordance with claim 1 in which M is tin.

7. A method in accordance with claim 1 in which R is a radical selected from the group of methyl, ethyl, n-butyl, 1-methyloctyl, and mixtures of hydrocarbon radicals derived from coconut oil.

8. A method in accordance with claim 7 in which R is a methyl radical.

9. A method in accordance with claim 7 in which R is an ethyl radical.

10. A method in accordance with claim 7 in which R is an n-butyl radical.

11. A method in accordance with claim 7 in which R is a 1-methyloctyl radical.

12. A method in accordance with claim 7 in which R is a mixture of hydrocarbon radicals derived from coconut oil.

13. A method in accordance with claim 1 in which said reaction is exothermic, is conducted at a temperature of about 0° to 200° C. and said carbon dioxide is added to said mineral oil solution in the solid state to control said exothermic reaction within the stated temperature limits.

14. A method in accordance with claim 13 in which said mineral oil is a 200 vis. neutral oil.

References Cited in the file of this patent

UNITED STATES PATENTS

| | | |
|---|---|---|
| 1,972,962 | Tisdale et al. | Sept. 11, 1934 |
| 2,046,876 | Jones | July 7, 1936 |
| 2,046,884 | Seman | July 7, 1936 |
| 2,406,960 | Neal | Sept. 3, 1946 |
| 2,810,736 | Caltin et al. | Oct. 22, 1957 |
| 2,957,826 | Martinek | Oct. 25, 1960 |

FOREIGN PATENTS

| | | |
|---|---|---|
| 460,389 | Great Britain | Jan. 27, 1937 |

OTHER REFERENCES

Levine et al.: "The Chemistry of the Alkali Amides, III," Chemical Reviews, vol. 54, No. 3, June 1954, pages 453 and 488 relied on.

Dermer: "Metallic Salts of Alcohols and Alcohol Analogs," Chemical Reviews, vol. 14, 1934, pages 415–416, 386 and 391 relied on.